Patented May 31, 1932

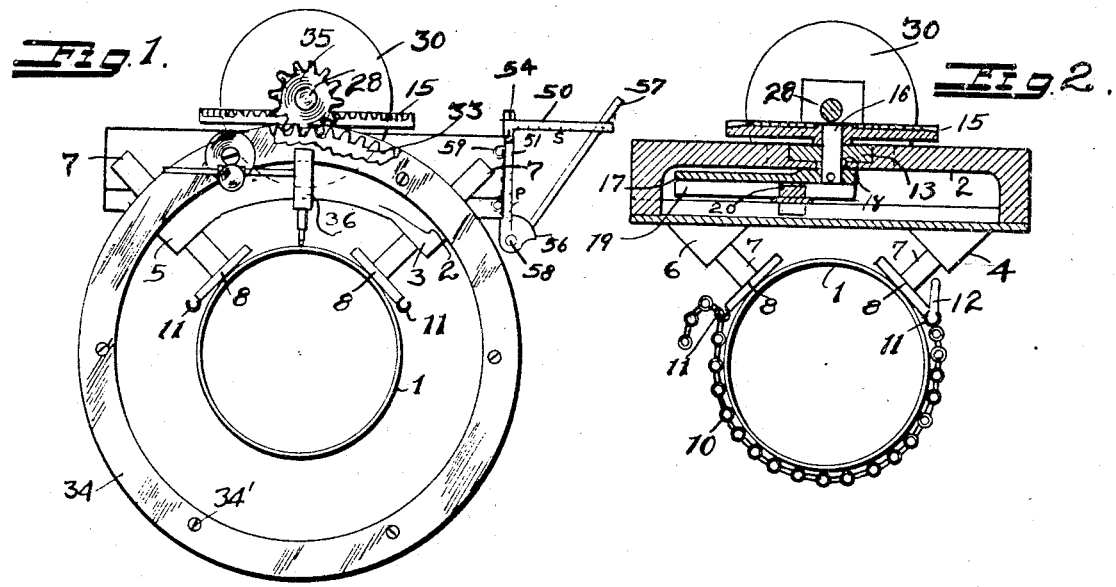
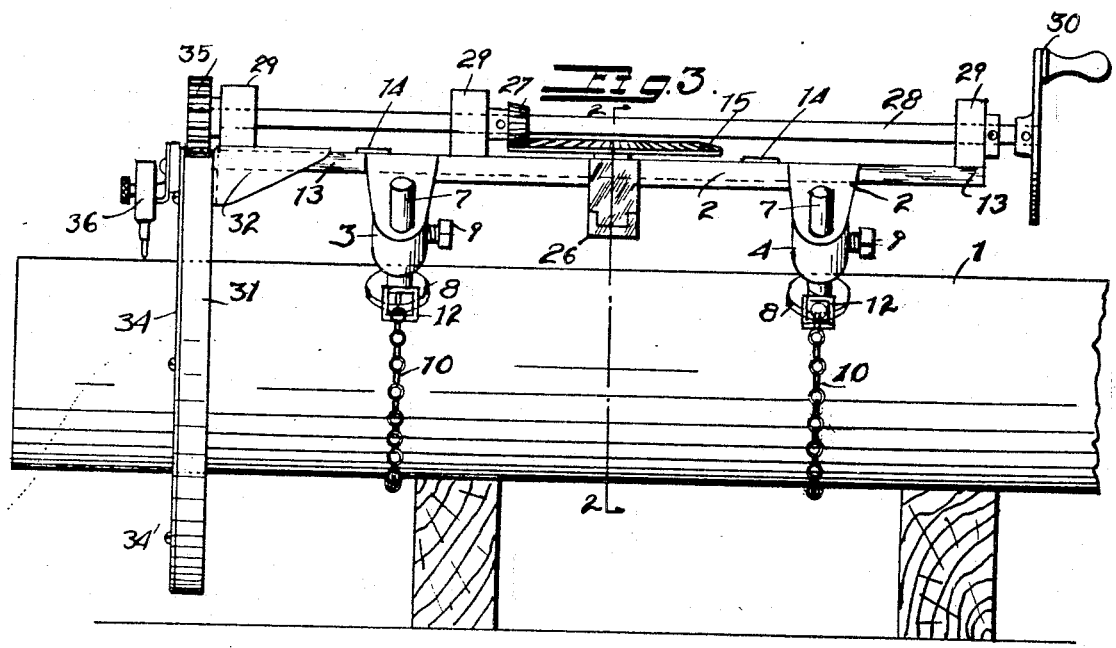
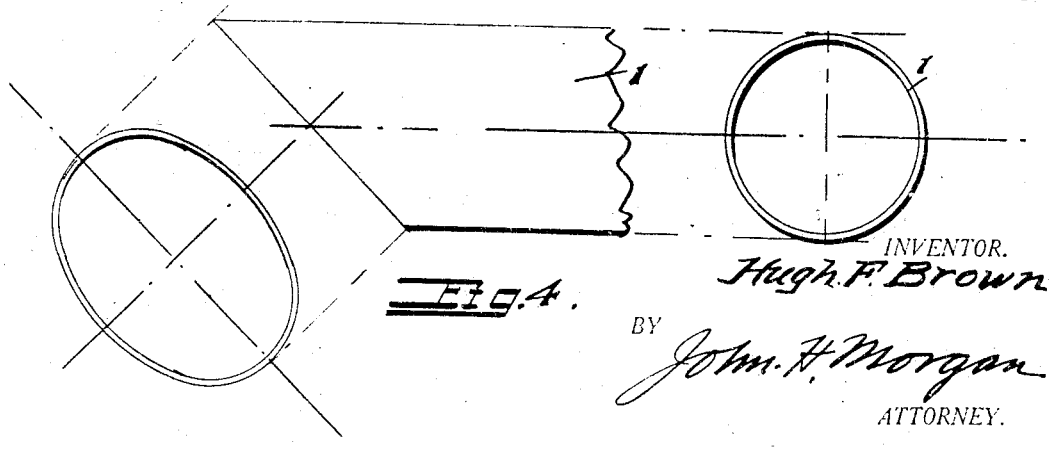

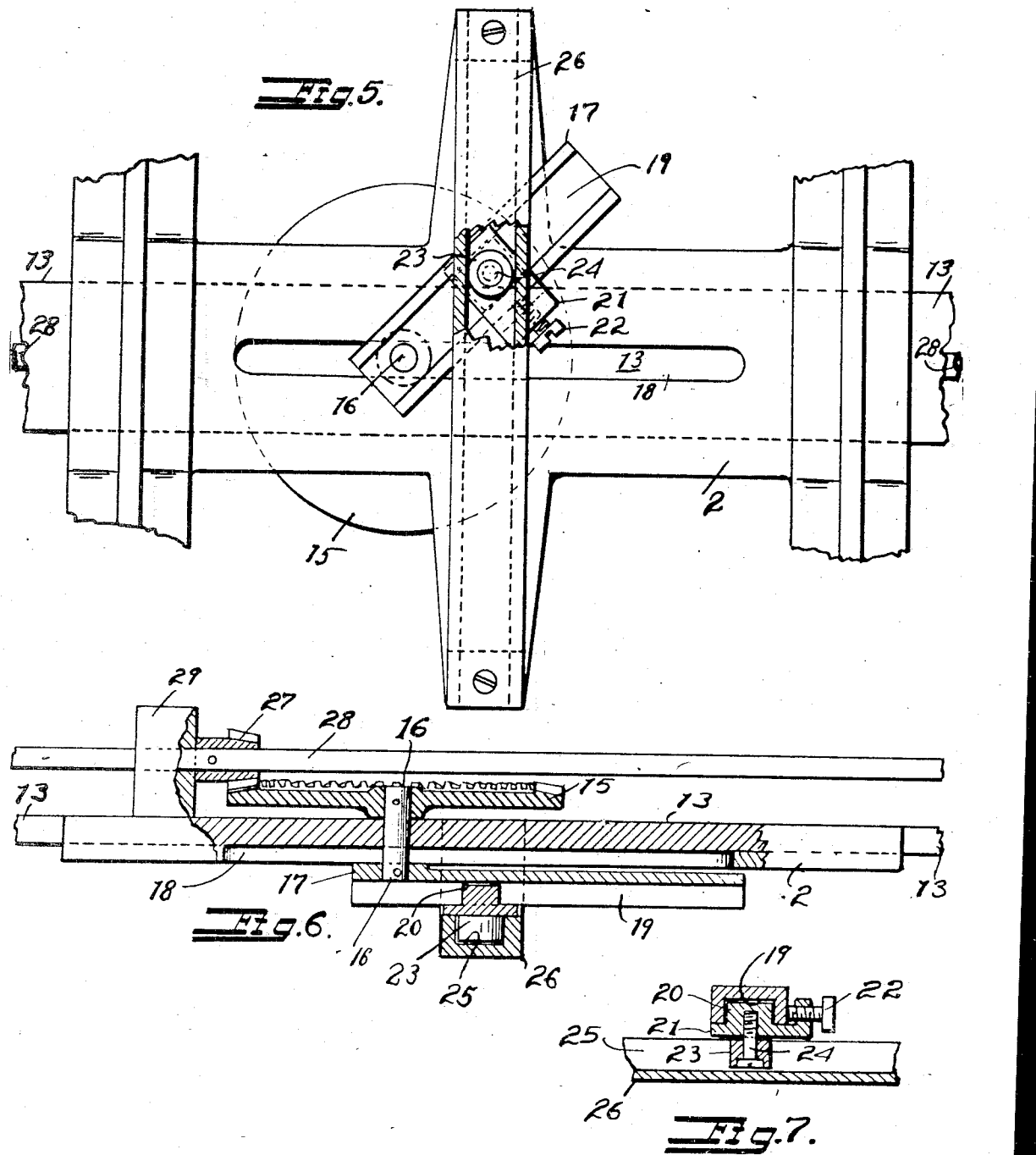

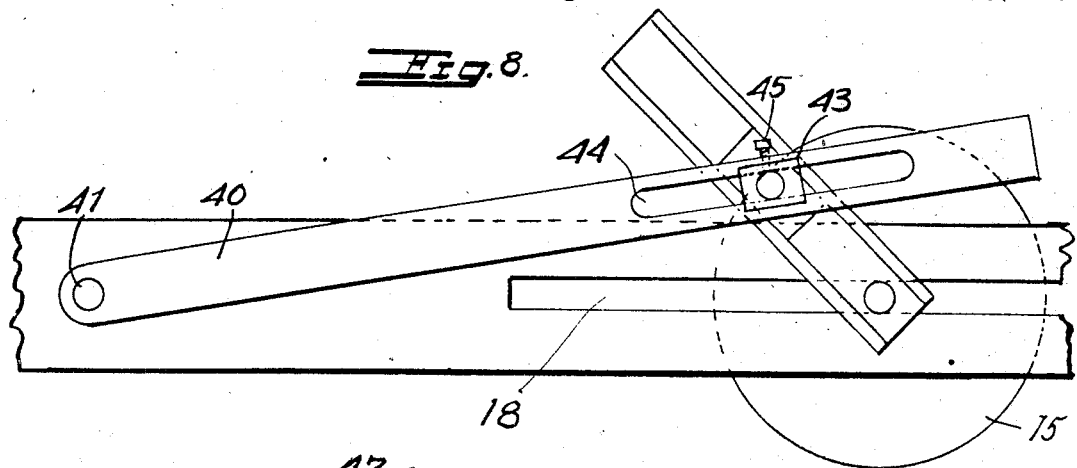
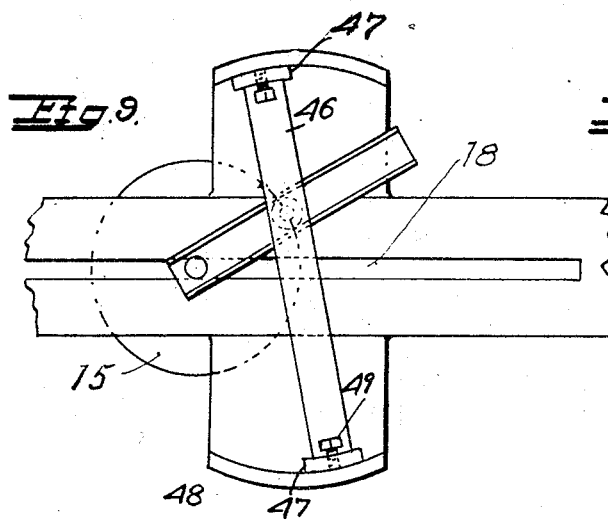
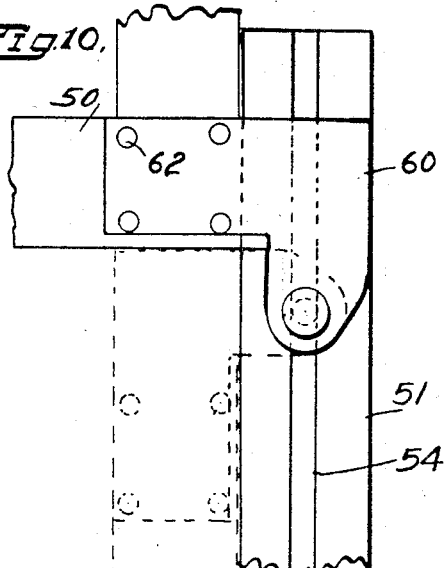
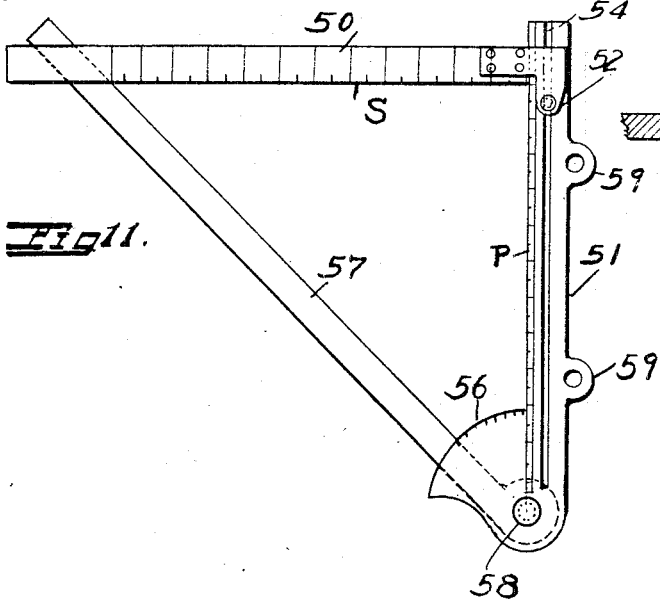

1,860,653

UNITED STATES PATENT OFFICE

HUGH F. BROWN, OF SAN FRANCISCO, CALIFORNIA, ASSIGNOR TO BROWN BROTHERS WELDING COMPANY, OF SAN FRANCISCO, CALIFORNIA, A COPARTNERSHIP COMPOSED OF HUGH F. BROWN AND WILLIAM P. BROWN

PIPE CUTTING MACHINE

Application filed August 12, 1931. Serial No. 556,603.

This invention relates to pipe cutting machines, and more particularly to a machine for cutting off pipe at various angles by means of an oxy-acetylene torch carried around the outside surface of a pipe to be cut.

It is well understood by those familiar and skilled in the art of welding the ends of two pipes together at an angle, that the pipes must be cut exactly on the angle desired, and that heretofore it has been a very difficult problem to cut a pipe quickly and accurately using the most practical means,—the oxy-acetylene cutting torch. Various devices have been tried to improve the means, but most of these efforts have been more or less complicated, and have not as yet proven successful, one reason being that a machine of this kind must be simple, and strong to stand rough handling, it must be portable as the work is done in the field where the pipes are cut and welded as they are laid; and among the objects of the invention is to provide a machine that can be applied directly to the pipes in the field, which can be quickly transported from one place to another, and cut the pipe at any angle positively and accurately.

Another object is to provide means to cause the cutting torch to follow a path of travel around the pipe to correspond to the angle at which the pipe is to be cut.

Another object is to provide means to carry a torch around the pipe concentrically, and at the same time cause the torch to move longitudinally of the pipe to form the elipse corresponding to the angle required.

Another object is to provide a portable ring adapted to carry the cutting torch, means to rotate the ring around a pipe to be cut, and means to reciprocate the ring longitudinally of the pipe simultaneously, to cut the pipe at the required angle for any desired shape.

Another object is to provide a portable frame to be clamped to a pipe to be cut, a member mounted in the frame adapted to slide longitudinally of the pipe, a rotatable ring mounted on said member at right angles and concentric to the pipe, a cutting torch on the ring, and means to rotate the ring, and move the sliding member simultaneously to form the exact elipse of the angle at which the pipe is cut.

Another object of this invention is to provide a machine of this kind whereby changing the ratio of speed between the ring that carries the cutting torch, and the travel of the plate that carries the ring so that the pipe may be cut in various shapes, as required.

Another object is the provision of means to indicate the distance off center the crank pin must be set to cut the pipe on the required angle, the diameter of the pipe, and the angle it is to be cut being determined.

A further object is to provide a machine in which a great many shapes may be cut in a pipe by slight changes in the setting, and mechanism of the machine.

Other objects will appear to those skilled in the art as the description progresses.

An embodiment of the invention is shown in the accompanying drawings in which the same reference numerals is applied to the same portion throughout the several views and of which there may be modifications.

Figure 1 is an end view of the machine, and of a pipe to be cut.

Figure 2 is a cross sectional view taken on line 2—2 of Figure 3.

Figure 3 is a side elevation of the machine and pipe.

Figure 4 shows a pipe cut at an angle, the elipse of the angle, and an end view of the pipe, all connected by dotted lines.

Figure 5 is a view looking from the bottom of the frame, showing the transverse guide bar, and portions of the frame and slide member, partly in section.

Figure 6 is a sectional view showing a portion of the frame, and slide member, gears, and crank arm.

Figure 7 is a sectional detail of the adjustable crank pin.

Figure 8 is a modified form in which a pivoted link is used in place of the transverse bar to cause the longitudinal travel of the crank.

Figure 9 is another modified form in which the transverse bar is pivoted and can be set on an angle.

Figure 10 is an enlarged detail of the joint of the right angle bars as shown in Figure 11.

Figure 11 is a view of the device to determine the offset of the crank pin detached from the machine.

Figure 12 is a sectional detail of the joint.

The numeral 1 indicates a pipe or tube on which is mounted the machine for cutting off the pipe. To hold the mechanism on the pipe securely, a frame 2 is provided which has bosses 3—4—5 and 6 in which are mounted the sliding rods 7 having the foot plates which rest on the pipe, these plates may be of any suitable shape.

Various means may be used for adjusting and holding the rods 7, one way would be to have screw threads on the rods, and a hand wheel to turn them for adjustments. In the present instance, set screws 9 are used to hold the rods. Chains 10 connected the foot plates under the pipe by means of the hooks 11. Suitable quick detaching and tightening means 12 is shown to clamp the frame rigidly to the pipe.

There is a slot in the frame to receive the slidable plate 13 which is held in place by the small plates 14.

Mounted on the slide is the horizontal bevel gear 15 by means of the short shaft 16 which is fixed in the gear, and has a bearing in the slide 13. The shaft projects below the frame 2, and has the crank arm 17 fixed on the end. There is a slot 18 in the frame to allow for longitudinal movement of the shaft 16.

The crank arm has the guiding channel 19 in which a block 20 is adapted to slide. There is a flange 21 on the block which turns up on one side to form a support for the set screw 22, the end of which impinges on the side of the crank arm to hold the block in any adjusted position in the channel 19. Depending from the flanged block is mounted a crank pin roller 23, on the pin 24, and this roller fits into the channel 25 of a transverse bar 26 on the frame 2, this channeled bar acts as a guide for the crank pin roller, and allows for the circular movement of the crank arm.

The arrangement of the mechanism is such, that if the block 20 is set in the channel 19 so that the center of the roller 25 is in line with the center of the shaft 16, the turning of the crank arm will not cause any longitudinal travel of the shaft and arm, but when the block 20 is moved along the channel 19 and set, the revolving of the crank arm will reciprocate the shaft longitudinally equal to the crank circle as set, the roller 23 moving transversely in the channel 25. The gear 15 is in mesh with the pinion 27 fixed to the shaft 28 which has bearing blocks 29 fixed to the sliding plate 13. The shaft is turned by the crank disk 30 which is fixed to the shaft. At the end of the slidable plate is mounted a ring housing 31 having a suitable brace 32 to hold it rigid, and rotatably mounted in the housing is the toothed ring 33 to which is fixed the plate 34 by means of the screws 34'. The toothed gear is in mesh with the pinion 35 which is fixed on the shaft 28. The ratio of the gearing is such in this instance, that for a complete revolution of the toothed gear 33, there is a complete revolution of the crank shaft 17. Mounted on the plate 34 is a cutting torch 36 of suitable design, which is adapted to cut through the pipe shell as it is moved around the pipe. An oxy-acetylene torch is preferred as the means for cutting through the pipe, but it is obvious that any cutting means that will cut through may be used in connection with this machine to make the cut.

The transverse channel bar is shown as having a straight channel to guide the crank pin roller 23, and this is required for straight angle cuts, but variations may be made in this channel guide to obtain different shaped cuts across the pipe for instance it could have a predetermined curve to obtain some desired result.

In the form shown in Figure 8 a link 40 pivoted at 41 on the frame of the machine acts to guide the crank pin slide 43 in the slot 44 where it may be adjusted in any position by the set screw 45. The form shown in Figure 9 allows of setting the transverse bar at an angle. The bar 46 having slidable guides in the circular guide ways 48, the set screws 49 hold it in place.

In order to save time, it is necessary to have on the machine means to show quickly how much to set the crank pin off center to cut a certain size pipe at a certain angle. Such a device is shown on the machine in Figure 1 and in detail in Figures 10, 11 and 12. The bars 50 and 51 are at right angles to one another. The bar 50 being slidable on the bar 51 by means of the pins 52 and 53, the ends of which slide in the grooves 54 and 55. This allows the bars to fold together. The bar 51 is graduated in inches to indicate the pipe diameter as at P. The bar 50 has graduations in inches at S indicating the distance off center the crank pin must be set. A segment of a protractor 56 is mounted on the bar 51, and a bar 57 is pivoted at 58. Lugs 59 are provided for bolting to the machine. The bar 50 has the brackets 60 and 61 held in place by the rivets 62. A portion 63 is flush with the bar to allow the bar 57 to fold close to bar 51. In operation the bar 50 is moved on bar 51 to indicate the diameter of the pipe, then the bar 57 is swung on its pivot to the degrees of the angle, and the amount to offset the crank pin is read on the bar 50.

The operation of the machine is as follows:

The pipe to be cut is raised and blocked on timber or the like, and the machine placed with the foot plates on the upper part of the pipe and adjusted to bring the ring housing concentric over the end of the pipe, now the chains brought under the pipe and fastened to clamp the frame securely in place. If the pipe is to be cut off at an angle the block 20 is moved and set off center from the shaft 16 the required distance to outline the elipse for a certain angle found by the instrument described above, the crank arm having graduations in inches along its length. The sliding plate 13 being set at its extreme forward stroke, the cutting torch is adjusted and started, the crank 30 is now turned as the torch cuts through the metal, a complete turn of the toothed gear carrying the torch moves the sliding plate back and forward to outline the elipse of the angle.

It will be seen from the above description taken with the drawings that provision is made to carry out the objects of the invention as set forth.

Having thus described my invention what I desire to secure by Letters Patent of the United States is as follows but modifications may be had in carrying out the invention as shown in the accompanying drawings and particularly described form thereof within the purview of the annexed claims.

I claim:

1. A pipe cutting machine of the class described comprising a frame adapted to be clamped to a pipe to be cut off, a plate mounted to slide longitudinally of said pipe in said frame, a ring housing mounted on said plate concentric with said pipe, a rotatable ring in said housing, a cutting torch on said ring, a vertical shaft projecting above and below said plate, and having a bearing in the plate, a bevel gear on the upper end of said shaft, a crank arm on the lower end, a transverse guide bar in said frame, a pin adapted to be guided in transverse motion in said bar, means to adjustably connect said pin to said crank arm, and means to turn said crank arm one revolution while the rotatable ring is turned one revolution.

2. A machine of the class described comprising a frame adapted to be clamped to a pipe to be cut, a plate mounted to slide longitudinally of said pipe in said frame, a transverse guide bar in said frame, a shaft mounted in said plate, a crank arm on said shaft, a pin adapted to slide in said transverse guide bar and be adjustably attached to said crank arm whereby the turning of the crank arm will move the plate, a ring housing on said plate, a rotatable ring in said housing, a cutting torch on said ring, and means to turn the ring and crank arm one revolution simultaneously.

3. A machine for cutting pipe comprising a frame to be attached to a pipe to be cut, a longitudinally slidable plate in said frame, a ring housing on said plate, a rotatable ring in said housing, a cutting torch on said rotatable ring, a shaft in said plate, a crank arm adapted to be rotated horizontally mounted on said shaft, a transverse guide on said frame, a longitudinally adjustable block in said crank arm, a pin on said block adapted to slide in the transverse guide whereby a complete turn of the crank arm will reciprocate said plate and ring housing, and means to drive said rotatable ring and said crank arm simultaneously.

4. A machine of the class described comprising a frame adapted to be clamped to a pipe to be cut, a plate mounted to slide longitudinally of said pipe in said frame, a transverse guide bar pivoted in said frame, means to hold said bar in different positions, a shaft mounted in said plate, a crank on said shaft, a pin adapted to slide in said transverse guide bar and be adjustable relatively to said crank arm whereby the turning of the crank arm will move said plate, a ring housing on said plate, a rotatable ring in said housing, a cutting torch on said ring, and means to turn the ring and crank arm in geared ratio to produce the desired shape of cut on the pipe.

5. A machine of the class described comprising a frame adapted to be clamped to a pipe to be cut, a plate mounted to slide longitudinally of said pipe in said frame, a shaft mounted in said plate, a crank arm on said shaft, means to adjustably connect said crank arm to said frame whereby the turning of the crank arm will reciprocate the plate, a ring housing on said plate, a rotatable ring in said housing, a cutting torch on said ring, and means to turn the ring and crank arm in geared ratio to produce the desired shape of cut on the pipe.

6. A machine of the class described comprising a frame adapted to be clamped to a pipe to be cut, a plate mounted to have a reciprocating motion longitudinally of said pipe in said frame, a shaft projecting through said frame and said plate, a slot in said frame longitudinally of said pipe for said shaft, a crank arm on said shaft, a longitudinal guideway in said crank arm, a block in said guideway, means to hold said block in any adjusted position in said guideway, a pin in said block, a roller on said pin, a transverse guideway for said roller whereby the turning of said crank arm will reciprocate said plate, means to turn said shaft and crank arm, a ring housing on said plate, a rotatable ring in said housing, a cutting torch on said ring, and means to turn the ring one revolution to one turn of the crank arm.

7. A machine of the class described comprising a frame, a plate slidable longitudinally in said frame, a ring housing on said plate, a rotatable ring in said housing, a torch for cutting metal on said ring, means to hold said frame longitudinally of a pipe to be cut, means to set said ring housing concentric to said pipe, a vertical shaft having a bearing in said plate and extending above said plate, and below said frame, a slot in said frame for said shaft, a channel shaped crank arm on said shaft below said frame, a block adjustably fixed in said channel, a pin in said block having a roller below said arm, guiding means to connect said roller to said frame so that when said crank arm rotates a reciprocating motion will be imparted to said plate, and means to drive said shaft.

8. A machine of the class described comprising a frame, a plate slidable longitudinally in said frame, a ring housing, a rotatable ring in said housing, a cutting torch on said ring, means to rotate said ring, and adjustable means mounted on said plate and connected to said frame to move said plate to and fro while said ring makes one revolution.

9. A machine of the class described comprising means to carry a cutting means around the outer surface of a pipe, a rotatable crank arm having adjustable connecting means adapted to move said cutting means by said crank arm longitudinally of said pipe to cut an elipse around said pipe at a predetermined angle, and means to drive said cutting means and crank arm simultaneously.

10. A machine of the class described comprising means to carry a cutting means around a pipe, a crank arm having a shaft adapted to move said cutting means longitudinally of said pipe, a crank pin in said crank arm, means adjustably securing said pin in said arm, guiding means for said pin whereby said shaft is moved to and fro with the cutting means and while the cutting means travels around the pipe to cut an elipse for any desired angle of cut, and means to drive said cutting means and said crank shaft.

HUGH F. BROWN.